Sept. 1, 1925.
A. G. HUMPHREY ET AL
HEAD GATE
Filed March 15, 1923
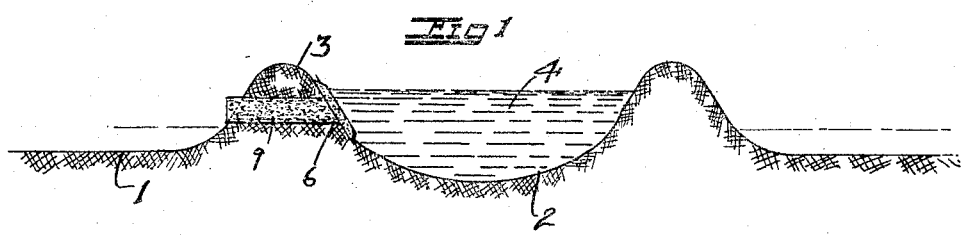
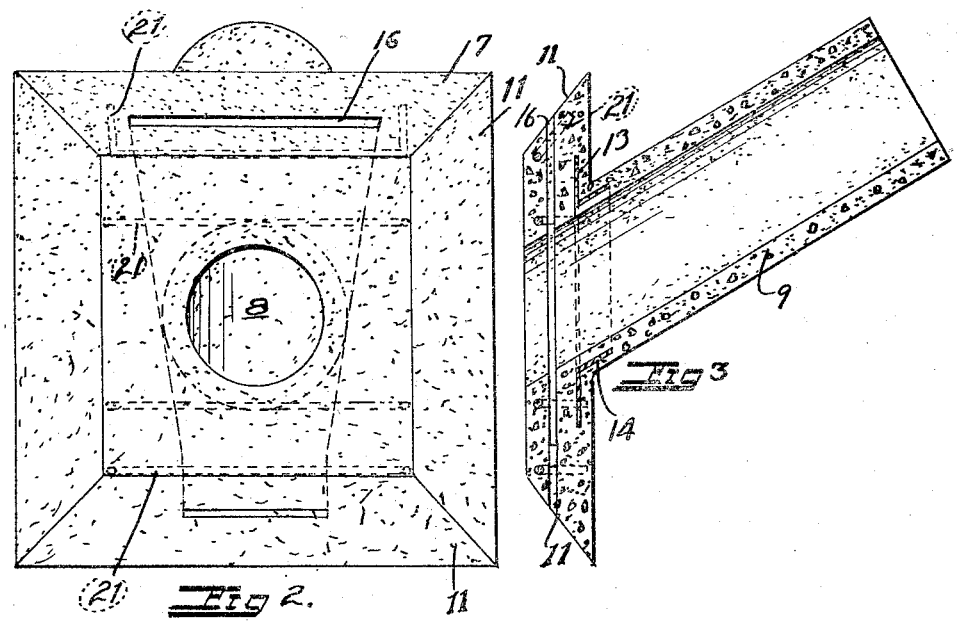
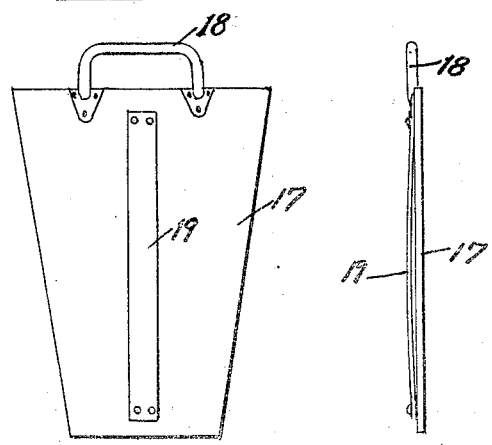
INVENTORS
A. G. Humphrey
H. C. McCarthy
ATTORNEYS Patented Sept. 1, 1925.

1,551,883

UNITED STATES PATENT OFFICE.

ANDREW G. HUMPHREY AND HARRY C. McCARTHY, OF RIPLEY, CALIFORNIA.

HEAD GATE.

Application filed March 15, 1923. Serial No. 625,383.

*To all whom it may concern:*

Be it known that we, ANDREW G. HUMPHREY and HARRY C. McCARTHY, citizens of the United States, and residents, respectively, of Ripley, county of Riverside, State of California, have invented a new and useful Head Gate, of which the following is a specification.

The present invention relates to improvements in head gates adapted to be used in connection with irrigation ditches for the purpose of controlling the flow of water. As practiced at the present time water is usually guided to the land to be irrigated by means of ditches provided with levees on either side adapted to allow the level of the water within the ditch to be raised above the level of the land to be irrigated. The land is usually subdivided into sub-areas by means of small dams and the water is allowed to successively enter upon the certain areas through holes in the levees. These holes may be dug into the levee at different places but it frequently happens, particularly when a heavy body of water is employed that the water in rushing through the hole enlarges the same and makes it difficult to stop the hole after the sub-area served by said hole has been irrigated and when it is desired to proceed to the next sub-area. For this reason it is desirable that permanent holes of rigid outlines be provided in the levee in suitable places which may be closed by suitable mechanical means and which prevent the water from enlarging the hole. It is the object of this invention to provide a head gate which is particularly adapted for this purpose and while convenient in operation is permanent in its nature, prevents the water from passing the gate, from digging into the levee and allows of absolute control of the water.

The preferred form of our invention is illustrated in the accompanying drawing in which Figure 1 shows a general ditch arrangement including a side view of our device, Figure 2 a front view of our device, Figure 3 a central section through the same, Figure 4 a detail front view of a sliding gate and Figure 5 a side view of the latter.

While we have shown only the preferred form of the invention it should be understood that various changes or modifications may be made within the scope of the claims hereto attached without departing from the spirit of the invention.

The land (1) to be irrigated is separated from the ditch (2) by means of a levee (3) which allows the level of the water (4) to be raised above the level of the land. In the levee is provided our head gate (6) comprising preferably a slab (7) of concrete having a central perforation (8) therein which latter communicates with a pipe (9) also preferably made of concrete. The slab (7) is preferably made of square or rectangular outlines with sloping sides (11) so that when the slab is placed on the levee in the manner illustrated in Figure 1 the water rushing past the slab will be prevented from forming eddy currents and from loosening the soil around the slab and working behind the same. The slab and the pipe (9) are preferably cast in one piece in the manner illustrated in Figure 3 so as to form an angle corresponding to the angle formed by the side of the leveee with a horizontal line so that when the slab is in place the pipe will pass through the levee horizontally. To reinforce the juncture between the slab and the pipe we preferably provide a reinforcing ring (13) surrounding the perforation in the slab having a flange (14) extending therefrom into the pipe so that the reinforcing member runs substantially parallel to the lines dividing the juncture.

In the slab is provided a vertical slot (16) passing the perforation (8) and adapted to slidably receive the gate (17) provided with a handle (18) and a tension spring (19) adapted to engage the wall of the slot for the purpose of holding the gate in any desired intermediate position. The weakness in the structure which might possibly be occasioned by the slot (16) may be compensated for by reinforcing members (21) surrounding the slot.

It should be understood that while our device is preferably moulded in one piece as a single unit we do not wish to be confined to this particular feature but desire protection on the head gate as such irrespective of the manner of securing a pipe thereto. It should also be understood that while the device is particularly described in the above specification with reference to the levee of an irrigation ditch it may be used for various other purposes as for instance for the purpose of heading off a body of water whereby the water level may be raised. It should also be understood that our head gate is not necessarily made of concrete although at the present time this seems to be the most suitable material for the same.

The slot (16) is preferably carried through to the bottom of the slab so as to allow silt accumulating in the bottom thereof to be pushed through the same.

We claim:

1. A head gate for an irrigation ditch comprising a slab of concrete material having an aperture therein, a gate slidably mounted in a slot within the slab adapted to close the aperture and reinforcing members formed integral with the concrete for reinforcing the slab section weakened by the slot.

2. As an article of manufacture, a head gate for an irrigation ditch comprising a thick slab of concrete material perforated transversely to allow water to pass therethrough, a pipe formed integral with the slab and communicating with the opening therethrough and a gate for the opening, the slab being formed with a vertical slot in the body thereof allowing the gate to be slidably received therein.

ANDREW G. HUMPHREY.
HARRY C. McCARTHY.